United States Patent Office 2,739,900
Patented Mar. 27, 1956

2,739,900

CERAMIC DIELECTRIC OF HIGH SPECIFIC INDUCTIVE CAPACITY

Jean Day, Paris, France, assignor to Compagnie Generale de Telegraphie Sans Fil, a corporation of France No Drawing. Application June 14, 1952,
Serial No. 293,674

Claims priority, application France June 21, 1951

1 Claim. (Cl. 106—39)

The present invention relates to dielectrics, and has more particularly in view ceramic dielectrics of very high specific inductive capacity.

Known ceramics having a high specific inductive capacity, often higher than 1000, are composed of such materials as certain titanates, zirconates, titano-zirconates etc., crystallising with a crystalline structure of the type known as "perovskite." Now the specific inductive capacity of these ceramics, often called the "dielectric constant," varies as a function of the temperature over limits and with a rapidity depending more particularly upon their composition. This is inconvenient in the use of these ceramics, particularly when they are intended for the manufacture of condensers having a definite capacity.

Furthermore these ceramics often exhibit a rather high loss angle.

The object of the present invention is to provide a ceramic of definite composition, exhibiting a high specific inductive capacity (greater than 1500) which does not vary much with the temperature, having a relatively low loss angle, and presenting a very high insulation resistance.

The invention likewise relates to a method of manufacturing these ceramics.

According to the invention, the ceramic dielectric product is characterised by the feature that it comprises from 99 to 75 per cent. of a compound resulting from a combination, molecule by molecule, of one of the two oxides: oxide of titanium $TiO_2$ and oxide of zirconium $ZrO_2$, with at least one oxide selected from the group: alkaline earth oxides, rare earth oxides and oxide of lead, from 1 to 15 per cent. of a compound resulting from a combination, molecule by molecule, of cerium oxide with at least one of the oxides selected from the group: alkaline earth oxides, rare earth oxides and oxide of lead and less than 10 per cent. of fluxes, such as zinc oxide and silicious products.

The preferred composition is obtained with from 99 to 75 per cent. of barium titanate $BaTiO_3$, from 1 to 15 per cent. of barium ceriate $BaCeO_3$, and less than 10 per cent. of zinc oxide employed as a flux.

The method of manufacture of the ceramic dielectric according to the invention consists in pulverising the said compounds, mixing them in the above proportions, adding an organic binder to produce a member of the desired shape (by moulding or wire-drawing under pressure) and baking this member at a temperature between 1280 and 1400 degrees centigrade.

The ceramic dielectric of the invention exhibits a specific inductive capacity of about 1500, very slight dielectric losses (measured at 1000 kilocycles), the angle of dielectric losses being of the order of $70.10^{-4}$ (often indeed much less) between $-10°$ C. and $+70°$ C., and an insulation resistance $\rho$ greater than $10^{12}$ ohms per cm./cm.$^2$.

Moreover the specific inductive capacity of these ceramic dielectrics varies but little with the temperature. For a particular composition, comprising substantially:

97% of barium titanate $BaTiO_3$, and
3% of barium ceriate $BaCeO_3$, the specific inductive capacity is 2200 measured at 20° C., and the variation of the latter as a function of the temperature measured between $+70°$ C. and $-10°$ C. does not reach $\pm 5\%$. Furthermore this material does not exhibit any perceptible piezo-electric effect, and it is perfectly fluidtight.

From the point of view of physical structure the ceramic dielectrics of the invention are crystallised with a crystalline structure of the perovskite type, the components often being in solid solution one in the other.

It is to be noted that in no case should the titanium oxide and the zirconium oxide be found simultaneously in the dielectric product of the invention. In point of fact the said two oxides, if both present in the mixture, would give rise to the formation of titano-zirconates, the specific inductive capacity of which varies very rapidly as a function of the temperature in the neighborhood of ordinary temperature (20° C.). One can only tolerate at worst zirconic impurities in the titanium oxide and titanic impurities in the zirconium oxide on condition that these impurities amount to much less than 5%.

The best results have been obtained with barium titanate and barium ceriate, which may be mixed with ceriates of rare earths. The ceriates represent 15% by weight of the product, 7% of which may be formed by the ceriates of the rare earths. In practice, barium titanate and barium ceriate are used alone.

Good results are likewise obtained by utilising lead titanate and lead ceriate or else lead zirconate and lead ceriate; or alternatively lead titanate, barium titanate, lead ceriate and barium ceriate. The barium ceriate may be replaced by an alkaline earth ceriate, such as calcium ceriate.

All these titanates, zirconates and ceriates are of the "metatitanate" etc. type, that is to say, compounds molecule by molecule: barium titanate $BaTiO_3$ or else $(BaO)(TiO_3)$ etc. In the firing a slow rise of temperature is preferably provided, in order to permit the evacuation of the organic binder introduced into the paste as a plastifying agent, and the baking is effected in an oxidising atmosphere. Furthermore the usual precautions are taken to obviate the formation of carbides, which would impair the quality of the product.

The ceramic dielectric of the invention has many uses, particularly in the manufacture of condensers.

I claim:

A ceramic dielectric having a high specific inductive capacity, essentially consisting of 99–75% of lead titanate; and between 1–15% of lead ceriate.

References Cited in the file of this patent

UNITED STATES PATENTS 2,616,813   Klasens _____ Nov. 4, 1952